Patented Mar. 19, 1946

2,396,671

UNITED STATES PATENT OFFICE 2,396,671

ROSIN TREATMENT

Laszlo Auer, South Orange, N. J.

No Drawing. Application February 15, 1943,
Serial No. 475,961

10 Claims. (Cl. 260—105)

GENERAL FIELD OF INVENTION AND STATEMENT OF OBJECTS

This invention relates to treatment of rosin, and especially to treatment with certain modifying agents promoting softening or liquefaction of rosin.

As is known, gum or wood rosins contain mixtures of rosin acids, known today as abietic acid, pyro-abietic acid and d-pimaric acid amongst others. Such rosins commonly have an acid value of from about 145 to 185, usually from about 160 to about 168, and in their natural state they are ordinarily hard, brittle materials, of melting point from about 70° C. to about 85° C.

Rosin is a valuable raw material for a number of commercial purposes, such as in paper sizing, soap manufacture, and especially in the coatings and plastics industries. There are, in fact, a number of examples in the art of use of various rosin derivatives for purposes such as those mentioned. Some of the most important and common examples occur in the coatings industry, i. e., use of rosin derivatives in paints, varnishes and the like.

In its natural state, however, rosin is not well suited to many commercial purposes for which it is potentially a valuable raw material.

The primary object of the present invention is to modify various physical properties of rosin, whereby to produce modified rosin products which are better adapted to many uses for which rosin or rosin derivatives are now employed. In addition, the modifications brought about in accordance with the present invention make it possible and advantageous to use the modified rosin products for many purposes for which rosin in its natural state and also various derivatives thereof are not well suited.

To illustrate, reference is made to coating compositions, such as varnishes. In its natural state, rosin is a brittle material and therefore yields a brittle film when employed alone as varnish solids. Thus, rosin in its natural state does not have film forming characteristics such that it may satisfactorily be employed alone as vehicle solids in a coating composition. According to this invention modifications are brought about in the rosin so as to secure a rosin product having drying or film forming characteristics which are well suited to the coating composition industry, thereby even making possible employment of the modified rosin products alone as vehicle solids in varnishes and the like. Usually, however, at least some drying or semi-drying oil is advantageously used with the modified products.

Because of the improved properties of the modified rosin products, such products may be employed as a replacement ingredient, in substantial proportions, for linseed or other drying or semi-drying oils in paints and other coating and plastic compositions.

For certain special purposes in the soap and paper sizing industries, the modified rosin products of this invention may also be of advantage, notwithstanding the fact that the modified products have a reduced acid value.

One of the most important modifications brought about by the process of the invention is the softening or liquefying of the rosin, i. e., at least some reduction of brittleness or in melting point, or both. In addition, the process of the invention is notable in its effect on the acid value, the invention providing for appreciable reduction in acid value, as will further appear. In referring to changes of this type and in making comparisons of the modified products with products not treated with modifying agents, it is to be understood that the statements regarding changes and comparisons are always made on the basis of a relation between the product treated with a modifying agent and a product treated in exactly the same manner (heating, etc.) but without a modifying agent. The latter is often herein referred to as a "blank" or "control" experiment.

According to the invention, by appropriate control of treatment conditions, and by appropriate selection of materials, the degree of softening or liquefaction and also of acid value may be regulated to meet various different requirements. For instance, according to the invention, it is possible to very extensively soften the rosin, or to very extensively lower the acid value, or both.

Although the invention is not limited thereto, it is of especial importance and advantage that when employing certain treating agents contemplated and when employing certain treatment conditions, it is possible to change the physical character of the rosin from its natural hard and brittle condition to a consistency approximating the so-called "cold flow," i. e., a consistency according to which the material will gradually flow at normal room temperature, so that if a blob of the modified rosin is placed on a flat surface, it will more or less gradually flatten out, often at a rate which is not observable with the eye. For many purposes a liquefaction at least to this degree is desirable.

THE MODIFICATION PROCESS

The process of the invention involves heating the rosin in the presence of a modifying agent of the type mentioned just below, the duration of heating, temperature and other treatment conditions, as more fully explained herebelow, being controlled in accordance with the extent and type of modification desired.

In general, the modifying agents employed in accordance with the invention are metal soaps, especially those formed by reaction of certain metals with rosin acids, although at least certain soaps formed by reaction of metals with fatty acids may also be used.

Rosin acid or fatty acid soaps may either be added as such, or if desired, the rosin acid soaps may be formed in situ during the treatment of the rosin by adding soap forming agents, especially metals themselves or oxides or hydroxides thereof. Where fatty acids (fatty oils, etc.) are present during the treatment of the rosin, fatty acid soaps may also be formed in situ. In fact, fatty acids may be added to the rosin undergoing treatment for the very purpose of producing a fatty acid soap in situ.

With respect to the soaps to be used according to the invention, it may be said that rosin acid and fatty acid soaps of soap forming metals (or oxides or hydroxides thereof) are useable, especially soaps formed with those metals (or oxides or hydroxides) which yield rosinates having melting points lower than the melting points of rosinates formed with the alkali metals. Thus, the alkali metals (or oxides or hydroxides thereof) are useable only under special circumstances, if at all, because of the tendency of these soaps to contribute to excessively high melting point of the product. Of especial advantage are soaps formed with the alkaline earth metals, zinc and magnesium, and also with aluminum, tin, lead and iron, as well as with oxides and hydroxides of any of these metals. The soaps of these metals and metal forming agents are especially useful in effecting reduction in acid value or in melting point, or both, of the rosin being treated.

As will be pointed out more fully hereinafter, use of certain soaps in the class to which this application is directed, enables production of modified rosin products having quite a wide range of properties. As above noted, variations in treatment procedure, temperature, etc. also influence the properties of the modified rosin products, so that it is possible, according to the invention, to secure a modified product in which either the acid value or melting point is very extensively lowered, or in which both of these properties are simultaneously lowered to a considerable extent.

In carrying out the process, the rosin is heated between about 250° C. and 350° C., temperatures of at least about 290° C. being best suited to treatment with the modifying agents herein claimed. For certain purposes and with certain agents, as will further appear, the range is desirably from about 270° C. to about 310 or 320° C.

Anywhere from a trace or very small percentage, such as .5% or 1%, up to quite large quantities, for instance 50%, or even more, will function to modify the properties of the rosin in at least some respects. Usually not over about 30% of the soap should be employed, whether the soap is added as such or is formed in situ, and it will be found that a particularly advantageous range is from about 2% to about 5% or 10%.

Where the agent is being formed in situ, the percentage of metal or oxide or hydroxide added, will, of course, be different from the soap percentages given above. For instance, 0.5% of metallic iron (if all is used in formation of a rosinate) will form about 9.0% soap in situ.

In general, the reaction takes place within about 5 hours, although by varying reaction conditions the time may be more or less, even down to one half hour under favorable conditions. The effects of certain variations in temperature, percentage of modifying agent and time will be pointed out more fully hereinafter following analysis of examples herein disclosed.

Thorough dispersion of the modifying agent in the rosin is of importance and appropriate control of temperature and time both contribute to bringing about such thorough dispersion. Agitation may also be used as an aid to thorough dispersion.

Another important consideration is that the reaction is preferably carried out in the absence of air, or out of contact with any substantial quantity of air. For this purpose the reaction is desirably carried out in a closed vessel, though not necessarily under a positive pressure, so that the gases released, or gases and/or vapors evolved from the reaction mixture during the process, serve to exlude the air. Moreover, for this purpose it is also desirable to employ vacuum. Still further, reduction of the contact of air with the reaction mixture may be brought about by blanketing the surface of the reaction mixture with some inert gas, such as $CO_2$, $SO_2$ or nitrogen. Where vacuum is used, a pressure for instance of from 100 mms. Hg to about 450 mms. Hg will be found effective, although in some cases more or less may be used. Whatever means or procedure is employed, it is of advantage to so conduct the process as to reduce oxygen concentration in (or oxygen entry into) the reaction vessel and prevent entrance of fresh air or oxygen to the reaction mixture. For some purposes, it may be advantageous to operate at super atmospheric pressure.

Some more or less general considerations regarding the process should be noted, as follows:

Although the complete mechanism of modification may not be fully understood, it may be mentioned that rosin is believed to be an organic isocolloid, i. e., a colloidal system in which the dispersed phase and the dispersion medium are both of the same chemical composition, though present in different physical states.

By modification the relationship or relative proportions of the dispersed phase and dispersion medium may be altered. Moreover, the modification process apparently also involves decarboxylation, the extent of which is usually incomplete. Still further, the soap, whether added as such or formed in situ by reaction of the rosin with the metal or the compound employed, may influence the properties, and particularly the melting point of the product. For instance, since rosin soaps have relatively high melting points, when large quantities of soap are present, the melting point of the product may not be as low as when employing smaller quantities of soap. Under some conditions, with very large quantities of soap present the melting point of the product may even be higher than that of the untreated material, although such products may, of course, differ from the untreated material in other respects. The melting point apparently is the differential result of the liquefying effect of the treatment and of the influence of the relatively high melting point of the soap itself.

When the soap is formed in situ, the soap formation itself may be responsible for a part of the reduction in acid value, although as hereinafter demonstrated the reduction in acid value is usually greater than that to be expected from soap formation, apparently because of decarboxylation of those portions of the material which are not saponified.

Possibly also non-volatile aggregates or polymers are formed.

In considering the nature of the modifications, it is to be noted that, while some small loss in weight may occur by volatilization (usually not more than about 15-20%), no appreciable fractional or destructive distillation takes place. With appropriate precautions to avoid distillation the process can usually be carried out without loss of more than 10% or 15%, such small loss as does occur usually comprising water, $CO_2$, etc., at least in major part. As a precaution, the temperature should be kept below the boiling or distillation point of the main reaction product, under the applied reaction conditions of the process. By this precaution, destructive distillation or cracking is positively avoided.

The modified rosin product is quite unique, since the rosin molecule retains almost as many carbon atoms as are present in the initial basic constituents of the rosin, the number of carbon atoms being reduced only by that number involved in the decarboxylation. Still further, the types of constituents of the modified rosin are very few in number, probably not more than two or three, and these constituents are characterized by boiling points all lying within a narrow and relatively high temperature range, as can be demonstrated by subsequent distillation of the modified products. The modified products, for practical purposes, are non-volatile when exposed to the air.

It is of importance in securing various of the foregoing characteristics that the reaction take place without any appreciable concurrent distillation. In addition, the absence of air and/or control of temperature are important in avoiding destructive distillation.

Whatever the exact nature of the chemical, colloidal and/or physical changes which are brought about, in general the treatment provided in accordance with the present invention reduces the acid value of the modified product and also softens or liquefies the material. These changes, together with others which usually take place, such as imparting drying characteristics to the rosin, and improving film forming properties of the modified products as compared with untreated rosin in the absence of other vehicle solids, for instance, make possible or practicable use of my modified rosin products for many purposes for which rosin in its natural state is not suited, or at least not well adaptable, and for which many known rosin derivatives are likewise not satisfactory.

By appropriate selection of modifying agent and treatment conditions, such as temperature, time, vacuum, etc., various physical properties of the modified products may be controlled, notably the acid value, saponification value and physical consistency.

EXAMPLES

In considering various of the examples given herebelow it is noted that for purposes of convenient comparison, quite a number of the treatments were effected with 5% of the soap forming metal or soap forming compound. Since certain of the metals and compounds have greater soap forming capacity than do other metals and compounds, the actual quantity of soap produced and utilized in the treatment therefore differs in different examples, notwithstanding the fact that the same percentage of the metal or compound was initially introduced.

With regard to this matter it should also be kept in mind that for many purposes the quantity of soap produced by the employment of 5% of the soap forming metal or soap forming compound is considerably greater than would be preferable, since, for many purposes, somewhat lower melting points would be desired in the treated products than is obtainable where relatively large quantities of soap are present. Nevertheless, the several examples employing 5% of the metal or other soap forming material demonstrate the effect of the treatment on acid number, melting point and other properties.

In connection with this matter of soap formation and its effect on melting point and acid number, it is here mentioned that in the data given herebelow with regard to the several examples, the examples themselves are first considered, and thereafter there are given some figures showing the theoretically calculated soap formation and acid number drop to be expected from the employment of the given percentages of soap forming metals or compounds, assuming that all of the metal or compound actually entered into the reaction in a manner to produce the corresponding soap (which assumption is not always valid for reasons which will further appear).

In all of the examples below, WW wood rosin (Newport Industries) was employed, and in all cases (except as otherwise noted) a batch of 1,000 grams of the rosin was heated together with the treating agent in a 3-liter distilling flask.

Temperatures referred to are all given in degrees centigrade. The melting point of the products was determined by the mercury method, and the iodine determinations were made according to the Wijs method.

Certain of the examples are grouped together and considered more or less jointly, for the reason that they were performed under similar conditions.

*Comparative Examples 1–9*

Various results of this comparative series of examples are given herebelow in Table I.

In each example of this series 5% of the modifying agent indicated in the table was employed, the time of heating being 5 hours and the temperature 290° C. Moreover, in each case the pressure was 400 mms. Hg.

For the sake of further comparison, a similar batch (1,000 grams) of the same rosin (WW wood) was heated as a "blank" experiment (see A in the table below), under the conditions above specified, but without the presence of the modifying agent.

Certain characteristics of the initial untreated rosin are also included in the table—see item B.

By way of comparison with Example 9 above (Zirex) a batch of Zirex was heated by itself for 5 hours at 290° C. and under a pressure of 400 mms. Hg. This treatment conformed with that employed for the examples of Table I, and it is interesting to note that the treatment did not appreciably alter the characteristics of the material. This appears to be due to the fact that Zirex is a substantially pure zinc rosinate, and under the conditions of the treatment decarboxylation ap-

TABLE I

| Ex. No. | Agent | Melting point, °C. | Acid No. | Sap. No. | I$_2$ No. | Color | Consistency |
|---|---|---|---|---|---|---|---|
| 1 | Zinc dust | | 58 | 72 | 174 | Light | Plastic. |
| 2 | Iron dust | 69 | 52 | (Not taken) | 130 | Black | Slightly plastic. |
| 3 | Tin (mossy) | 75 | 130 | (Not taken) | 146 | Light | Very slightly plastic. |
| 4 | Aluminum dust | 72 | 118 | (Not taken) | 152 | Silver | Do. |
| 5 | Zinc oxide | | 71 | 75 | 182 | Med. brown | Plastic. |
| 6 | Calcium oxide | 56 | 46 | 95 | 196 | Light | Slightly plastic. |
| 7 | Calcium hydroxide | 92 | 15 | 85 | 201 | do | Very slightly plastic. |
| 8 | Lead oxide | 69 | 105 | (Not taken) | 157 | do | Slightly plastic. |
| 9 | Zirex [1] | | 97 | 107 | 170 | do | Plastic. |
| A | (Heated without agent) | 68 | 130 | 133 | 151 | do | Brittle solid. |
| B | (Untreated) | 81 | 169 | 173 | 206 | do | Do. |

[1] Zirex is a commercial product of Newport Industries, being a zinc rosinate having melting point of 150°C., acid number 115, and iodine number 154.

The designations under the consistency column may be further explained and amplified as follows:

Solid = consistency harder than that on which an impression can be made with the finger nail.

Slightly plastic = consistency such that an impression can be made with the finger nail, sometimes also displaying some degree of "cold flow."

Plastic = consistency such that the material may with ease be deformed with the finger and manifesting free "cold flow" characteristics.

No melting point determinations were made on "plastic" products because of the impracticability of securing accurate results.

The foregoing demonstrates that products of quite a wide variety of types may be secured by treatment with metal soaps. It will be noted that the table above includes examples (1, 2, 3 and 4) of use of the metals themselves to form a rosin acid soap in situ. The table further includes examples (5, 6, 7 and 8) of the employment of oxides and hydroxides as soap forming materials. Finally the table includes one example (9) of employment of a soap itself, pre-formed before being added to the reaction mass. Other examples in various of these groups appear hereinafter.

It should be noted that undissolved residues remained in the reaction vessel after a number of the foregoing treatments, indicating that not all of the modifying agent used entered into the reaction. Thus in Examples 1, 6 and 7, undissolved sludges were present at the end of the treatment.

parently does not occur where the rosin acids have been saponified.

Comparative Examples 10–12 and 13–14

To demonstrate the effect of variation of percentage of modifying agent, two comparative series of examples are given in Table II herebelow, one of these series employing different percentages of zinc dust and the other different percentages of iron dust. In the following table, the 5% zinc and iron examples of Table I are also included for purposes of comparison.

TABLE II

| Ex. No. | Agent | Melting point, °C. | Acid No. | Sap. No. | I$_2$ No. | Color | Consistency |
|---|---|---|---|---|---|---|---|
| 1 | 5% zinc dust | | 58 | 72 | 174 | Light | Plastic. |
| 10 | 2% zinc dust | | 71 | 77 | 182 | do | Do. |
| 11 | .5% zinc dust | | 87 | 102 | 174 | do | Do. |
| 12 | .1% zinc dust | 54 | 114 | 127 | 184 | do | Very slightly plastic. |
| 2 | 5% iron dust | 69 | 52 | (Not taken) | 130 | Black | Slightly plastic. |
| 13 | 2% iron dust | | 65 | 103 | 153 | Dark brown | Plastic. |
| 14 | .5% iron dust | 45 | 104 | 113 | 162 | do | Slightly plastic. |
| A | (Heated without agent) | 68 | 130 | 133 | 151 | Light | Brittle solid. |
| B | (Untreated) | 81 | 169 | 173 | 206 | do | Do. |

Undissolved modifying agent remained after certain of the foregoing treatments. Zinc dust remained in the reaction vessel in Examples 1, 10 and 11, the quantity in Example 1 being substantial but quite small in the others.

Example 15

This example (and also Example 16 just below) demonstrate the importance of effecting the treatment in a manner to bring about solution in the rosin of the soap formed in situ (or added as such).

In this example a batch of 1,000 grams of WW wood rosin was heated for 5 hours at 270° C. with 5% of zinc dust, the pressure being 100 mms. Hg. At the end of this 5 hour treatment period, the product apparently contained a large amount of soap (zinc rosinate) which was not molten at the reaction temperature and had not gone into solution in the rosin. A portion of the product was poured off and this portion had a melting point at 60° C., acid number 91, saponification number 108 and iodine number 194. This first product was of a gray-green color.

The remainder of the batch, containing a large quantity of soap, was then heated for 1¼ hours at a somewhat higher temperature, between about 290° C. and 310° C., the pressure now being 760 mms. Hg. (atmospheric). The final product was slightly plastic and of medium brown color, with a melting point at 63° C., acid number 90, saponification number 100 and iodine number 182. By this additional heating, the soap present apparently went into solution in the rosin and therefore became effective as a modifying agent, notwithstanding the fact that the quantity of soap was quite large.

*Example 16*

In a manner similar to that described just above, a batch of 1,000 grams of WW wood rosin was heated for 5 hours at 270° C., with 5% of iron dust, the pressure being 100 mms. Hg. After the treatment a portion of the product was poured off, leaving a partial batch containing a large quantity of a soap which was not molten at the reaction temperature. The portion which was poured off was of quite a dark color, having a melting point at 68° C., acid number 51, saponification number of 107 and iodine number 152.

The remainder of the batch was then heated at a higher temperature (290–310° C.) for 3 hours at 760 mms. Hg. (atmospheric pressure). This yielded a slightly plastic product of dark brown color having a melting point at 57° C., acid number 47, saponification number 94 and iodine number 133.

Here again it will be seen that treatment at higher temperature effected solution of the iron rosinate remaining from the first heating, whereupon appreciable reduction in melting point took place.

*Example 17*

In this example, 5% of magnesium dust was employed in a batch of 1,000 grams of WW wood rosin as before, the temperature being held at 290° C. for 2 hours and then at from 310 to 320° C. for 3 hours. The pressure was 400 mms. Hg. This product was of gray-green color with an acid number of 61, saponification number of 93 and an iodine number of 173. Although the melting point was higher than the untreated rosin, the product was very slightly plastic.

*Example 18*

In this example the treatment conditions, times, temperatures, etc. were exactly the same as in Example 17. Instead of the magnesium dust, however, Example 18 employed 5% of magnesium hydroxide.

The product was of a brownish color having an acid number of 77, saponification number of 106, and iodine number of 168. As with Example 17, although the melting point was raised above that of the untreated rosin, the product was slightly plastic.

*Example 19*

This example demonstrates the employment of a fatty acid soap in the treatment of rosin. For this purpose 5% of calcium stearate was employed, the batch again comprising 1,000 grams of WW wood rosin and being heated for 5 hours at 290° C., under a pressure of 400 mms. Hg. The product was very slightly plastic and of light color. Its melting point was 50° C., its acid number 118, saponification number 140, and iodine number 170.

As a blank or control experiment, 5% of calcium stearate was heated with a batch of 1,000 grams of rosin at atmospheric pressure, up to a temperature just sufficient to melt the batch and produce a homogeneous mixture. This occurred at 150° C. and the product had a melting point of 72° C., an acid number of 155, a saponification number of 166, and an iodine value of 216. Comparison of these figures and of those given shortly above with blanks A and B appearing in Tables I and II will immediately show that mere fusion of the rosin and calcium stearate together is not sufficient to appreciably alter the properties of the rosin. A substantial effect to soften the rosin is secured only by heating in the presence of the fatty acid soap for an appreciable length of time within the temperature range herein contemplated.

With regard to various of the foregoing examples, some additional data is given herebelow indicating the effect of soap formation on the acid number of the product.

In each example where a soap forming material was added to the rosin, so as to produce a soap in situ, calculations were made to determine the percentage of the entire batch which would be converted to soap, assuming that all of the modifying agent employed actually was converted to soap by reaction with rosin acids present. (As above noted, not all of the modifying agent always enters into a soap forming reaction, undissolved residues frequently remaining in the reaction vessel.) A further calculation was then made to determine what drop in acid number would be represented by such a total conversion of the modifying agent to soap.

The results of these calculations are given herebelow in Table III, together with certain other data, including the actual drop in acid number. Thus, in Table III column C represents the theoretical percentage of soap formed, if all of the modifying agent enters into the soap forming reaction, column D representing the theoretical acid number drop which would be expected from such a conversion. The figures in column E indicate the actual acid number drop, and in column F there are given figures representing column D subtracted from column E, i. e. the acid number drop (if any) over and above the theoretical drop calculated on the basis of complete conversion of the modifying agent to soap.

It will be observed that in some instances the quantity of modifying agent added was such that considerably more than the total of the rosin acids present could have been converted to soap.

By these calculations it is not intended to convey the impression that all of the modifying agent is in each example converted to soap. In fact, various factors plainly indicate that that is not the case. The calculations, however, do show that in many instances, even assuming maximum conversion of modifying agent to soap, there still remains a considerable drop in acid number, which is apparently represented by decarboxylation.

TABLE III

| A Exam. No. | B Per cent agent | C Theoretical per cent soap | D Theoretical acid number drop to form soap | E Actual acid number drop | F Minimum acid number drop due to decarb. |
|---|---|---|---|---|---|
| 1 | 5% zinc | 55.6 | 85.6 | 111 | 25.4 |
| 2 | 5% iron | 90.0 | 150 | 117 | |
| 3 | 5% tin | 33.0 | 47 | 39 | |
| 4 | 5% Al | 185.0 | 310 | 51 | |
| 5 | 5% ZnO | 44.5 | 68.6 | 98 | 29.4 |
| 6 | 5% CaO | 61.5 | 98.0 | 123 | 25 |
| 7 | 5% Ca(OH)$_2$ | 47.5 | 75.7 | 154 | 78.3 |
| 8 | 5% PbO | 18.8 | 25 | 64 | 39 |
| 10 | 2% zinc | 22.2 | 34.2 | 98 | 63.8 |
| 11 | 0.5% zinc | 5.56 | 8.6 | 82 | 73.4 |
| 12 | 0.1% zinc | 1.11 | 1.7 | 55 | 53.3 |
| 13 | 2% iron | 36.0 | 60 | 104 | 44 |
| 14 | 0.5% iron | 9.0 | 15.0 | 65 | 50 |
| 17 | 5% Mg | 142.0 | 230 | 108 | |
| 18 | 5% Mg(OH)$_2$ | 59.0 | 98.0 | 92 | |

Certain variations in procedure may be adopted.

For example, instead of using vacuum during the treatment period, other procedure may be adopted with a view to excluding air from the reaction. The form of the reaction vessel employed may be such that gases evolved from the reaction will serve to effectively exclude air, without applying vacuum. Furthermore, certain gases, such as $SO_2$, $CO_2$ or nitrogen can be either bubbled through the reaction mass or employed as a blanket on the surface of the batch undergoing treatment. Expedients of this type not only serve to exclude the air from the reaction but may also be utilized for their supplemental effect on the material being treated, this subject being more fully considered in copending application Serial No. 386,371, filed by one of the present applicants on April 1, 1941, which application issued on February 16, 1943, as Patent No. 2,311,200.

Moreover, as disclosed in the above mentioned copending application, still other variations in process may be employed for a number of different purposes, but it is not thought necessary to discuss these fully herein, since reference may be made to the copending application for that purpose. In passing, however, it is noted that additional treating agents, of a supplemental character, may also be present during the reaction, among which might be mentioned dissolution promoting agents of the type disclosed in issued Patent No. 2,293,038. Various combinations of modifying agents may also be used for different purposes, including combinations of the modifying agents above disclosed, as well as combinations of the modifying agents herein disclosed with other agents, for instance, as disclosed in the application and in the patent mentioned above.

It is further to be noted that in general increasing any one or all of the variables: namely, temperature, time of treatment and percentage of modifying agent, increases the extent of modification. It will be understood that the foregoing is a general rule normally applicable within the ranges of operation above indicated, although as to at least some variables, there may be limits beyond which the general rule does not apply. For instance, excessive increase in temperature may substantially alter the character of the process. On the other hand, excessive increase in percentage of modifying agent may not yield as soft a product as a lower percentage of the modifying agent because of the consequent formation of large amounts of relatively hard rosin acid soaps.

In considering the starting material on which the process may be employed, it is first noted that the process brings about changes both of colloidal or physical and also of a chemical nature. It is important, however, to bear in mind that the process essentially involves a reaction with the rosin molecule, that is, with the type of molecules of which the basic constituents of natural rosin are composed. Therefore, while rosin itself, such as gum or wood rosins, represents perhaps the most important starting material to which the process is adaptable, it is noted that the process may be employed on rosin which has been pretreated in various ways, or on mixed or chemically condensed materials incorporating rosin, since the reaction will take place wherever the rosin molecule is present, provided, of course, that the physical or chemical state or "environment" of the rosin molecule is not such as to prevent the reaction from taking place.

It may also be mentioned that there are other natural resins, such as copals, which act similarly to rosin by treatment in accordance with this invention. In fact, the reaction may be carried out on any of the natural resins containing high molecular resin acids. Therefore, wherever any such other natural resin behaves similarly to rosin, it is herein considered as an equivalent.

Copals are fossil gums which have to be "fused" before becoming soluble in organic solvents and miscible with fatty oils. When copals, for instance Congo copals, are used in the present process, they should be employed in the fused state.

The modified product of this invention may if desired, be subject to other treatment, depending upon the use for which it is intended. Thus, for example, the modified products may be vulcanized with sulphur. The modified resin products secured in accordance with the foregoing, may be vulcanized as such, or in solutions, such as varnish solutions, (in the latter case with sulphur chloride).

Further, they may be converted into emulsions and used for various purposes in that form.

In the event sulphur or other sulphur-like vulcanizing agents are used, vulcanization, for certain purposes, is desirably carried out at temperatures between about 120° C. and 200° C. For purposes where vulcanization is to be effected at lower temperatures, for instance, at room temperature, sulphur chloride, or similarly acting vulcanizing agents, should be used. In instances where the vulcanization is carried out in a varnish solution, the sulphur chloride treatment is especially practical.

As is mentioned in the copending application Serial No. 386,371, filed April 1, 1941, the modified rosin products may be subject to still other supplemental treatments, such for instance as esterification, as by treating with glycerine or other polyhydric alcohols, such as glycols, pentaerythritol, mannitol, sorbitol, etc.

The vulcanized liquefied resin products made in accordance with the invention have valuable properties for a number of purposes including the making of protective coatings, some of these vulcanized products being useful as plasticizers for coating compositions and plastics.

I claim:

1. A process for making a modified and softened rosin product from hard and brittle rosin, which process comprises adding a metal rosinate to the rosin, and heating the mixture out of contact with the atmosphere between about 250° C. and 350° C., but not above the temperature at which appreciable destructive distillation occurs under the conditions of the treatment, the time of treatment being at least 30 minutes and sufficient to appreciably reduce the acid value of the rosin as compared with the acid value of the same rosin heated to the same temperature under the same treatment conditions but without a modifying agent, said metal rosinate being a rosinate of metals selected from the class consisting of the alkaline earth metals, magnesium, zinc and aluminum.

2. A process in accordance with claim 1 in which the quantity of metal soap employed is from an appreciable fractional percentage up to about 50%.

3. A process for making a modified and softened rosin product from hard and brittle rosin, which process comprises adding up to about 50% of a metal rosinate to the rosin, and heating the mixture out of contact with the atmosphere between about 270° and 320° C., but not above the temperature at which appreciable destructive distillation occurs under the conditions of the treatment, the time of treatment being at least 30 minutes and sufficient to appreciably reduce the acid value and the melting point of the rosin as compared with the acid value and melting point of the same rosin heated to the same temperature under the same treatment conditions but without a modifying agent, said metal rosinate being a rosinate of metals selected from the class consisting of the alkaline earth metals, magnesium, zinc and aluminum.

4. A process in accordance with claim 3 in which the treatment temperature is from about 290° C. to about 310° C.

5. A process in accordance with claim 3 in which the quantity of rosinate used is not more than about 30%.

6. A process for modifying the properties of rosin, which process comprises adding to the rosin a metal oxide, and heating the mixture out of contact with the atmosphere between 270° C. and 320° C., but not above the temperature at which appreciable destructive distillation occurs under the conditions of the treatment, the heating being continued for at least 30 minutes, whereby to form a metal rosinate in situ, the quantity of metal oxide added being from an appreciable fractional percentage up to that quantity capable of converting one third of the rosin acids present to rosinates, said metal rosinate formed in situ being a rosinate of metals selected from the class consisting of the alkaline earth metals, magnesium, zinc and aluminum.

7. A process for modifying the properties of rosin, which process comprises adding to the rosin a metal hydroxide, and heating the mixture out of contact with the atmosphere between about 270° C. and 320° C., but not above the temperature at which appreciable destructive distillation occurs under the conditions of the treatment, the heating being continued for at least 30 minutes, whereby to form a metal rosinate in situ, the quantity of metal hydroxide added being from an appreciable fractional percentage up to that quantity capable of converting one third of the rosin acids present to rosinates, said metal rosinate formed in situ being a rosinate of metals selected from the class consisting of the alkaline earth metals, magnesium, zinc and aluminum.

8. A process for making a modified and softened rosin product from hard and brittle rosin, which process comprises incorporating in the rosin from an appreciable fractional percentage up to about 50% of a metal rosinate by adding to the rosin a member of the class consisting of metal rosinates, metal oxides, and metal hydroxides, (in the case of addition of metal oxides or metal hydroxides, the rosinates being formed in situ under the conditions of the treatment), and heating the mixture out of contact with the atmosphere between about 250° C. and 350° C. but not above the temperature at which appreciable destructive distillation occurs under the conditions of the treatment, the time of treatment being at least thirty minutes and sufficient to appreciably reduce the number of carboxyl groups present in a weight unit of the rosin as compared with the number of carboxyl groups present in the same weight unit of the same rosin heated to the same temperature under the same treatment conditions but without a modifying agent, the metal of said rosinate being selected from the class consisting of the alkaline earth metals, magnesium, zinc and aluminum.

9. A process for making a modified and softened rosin product from hard and brittle rosin, which process comprises incorporating in the rosin from an appreciable fractional percentage up to about 30% of a metal rosinate by adding to the rosin a member of the class consisting of metal rosinates, metal oxides and metal hydroxides, (in the case of addition of metal oxides or metal hydroxides, the rosinate being formed in situ under the conditions of the treatment), and heating the mixture out of contact with the atmosphere between about 250° C. and 350° C. but not above the temperature at which appreciable destructive distillation occurs under the conditions of the treatment, the time of treatment being at least thirty minutes and sufficient to appreciably reduce the number of carboxyl groups present in a weight unit of the rosin as compared with the carboxyl group content of the same weight unit of the same rosin heated to the same temperature under the same treatment conditions but without a modifying agent, the metal of said rosinate being selected from the class consisting of the alkaline earth metals, magnesium, zinc and aluminum.

10. A process in accordance with claim 9 in which the quantity of said rosinate is at least 2% and not more than 10%.

LASZLO AUER.